No. 812,805. PATENTED FEB. 20, 1906.
J. BEST.
PADDLE WHEEL.
APPLICATION FILED APR. 17, 1905.

WITNESSES.
J. R. Keller
Robert C. Totten

INVENTOR.
John Best
By Kay Totten & Winter
Attorneys

UNITED STATES PATENT OFFICE.

JOHN BEST, OF JEANNETTE, PENNSYLVANIA.

PADDLE-WHEEL.

No. 812,805.  Specification of Letters Patent.  Patented Feb. 20, 1906.

Application filed April 17, 1905. Serial No. 256,006.

*To all whom it may concern:*

Be it known that I, JOHN BEST, a resident of Jeannette, in the county of Westmoreland and State of Pennsylvania, have invented a new and useful Improvement in Paddle-Wheels; and I do hereby declare the following to be a full, clear, and exact description thereof.

My invention relates to paddle-wheels for propelling craft of different kinds.

The invention relates generally to that type of wheel illustrated and described in Letters Patent of the United States granted to me March 21, 1905, No. 785,286, in which fixed blades or paddles are arranged at an angle to the radius in which their corresponding spokes lie, so that when the wheel rotates the paddles strike the water approximately flatwise at the beginning of their strokes, while they leave the water substantially edgewise. By this construction much greater efficiency is obtained than where the paddles project in the same line with the radii of the wheel, and the strain on the wheel is greatly reduced, thereby reducing the power required correspondingly. However, when it is desired to reverse a wheel the paddles take into the water in a manner to produce just exactly the opposite result, and much unnecessary power is expended in lifting the water which is held by the blades as they emerge from the water.

The object of my present invention is to provide a paddle-wheel of the above type in which whether rotating in one direction or the other the paddles will enter and leave the water substantially flatwise and edgewise.

To these ends my invention comprises the novel features hereinafter set forth and claimed.

To enable others skilled in the art to make and use my invention, I will describe the same more fully, referring to the accompanying drawings, in which—

Figure 1:
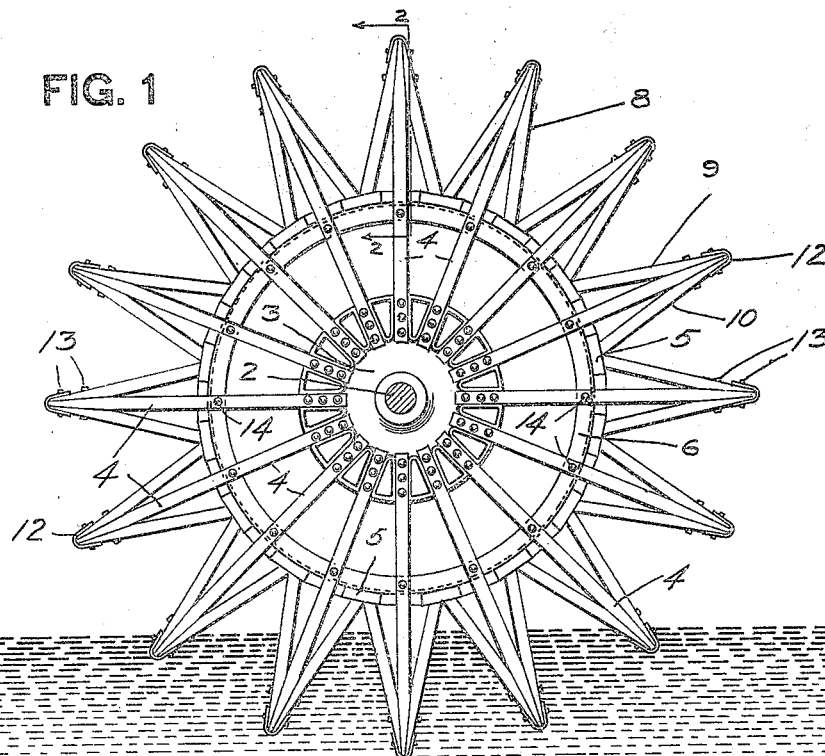
Figure 3:
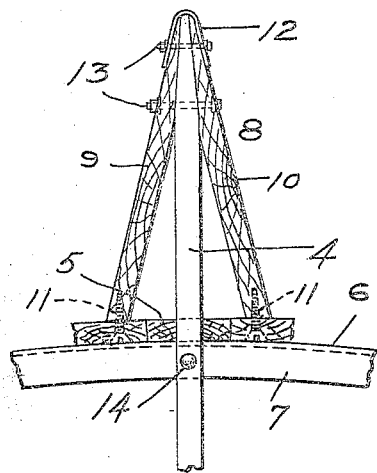
Figure 2:
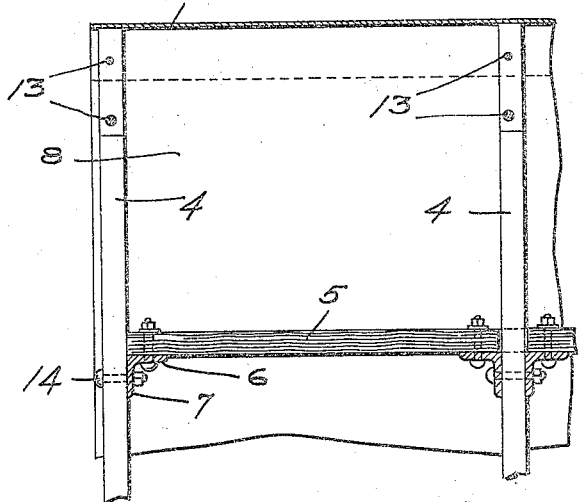

Figure 1 is a view in side elevation of my improved wheel. Fig. 2 is an enlarged section on line 2 2, Fig. 1. Fig. 3 is an enlarged view of one of the paddles.

Like numerals indicate like parts in each of the figures.

The numeral 2 designates the central shaft or axis, to which are secured the hubs 3. Radiating from the hubs 3 are the spokes 4. A drum 5 is secured between the hubs 3, said drum being formed of wood or metal, as may be found desirable. An angle-bar 6 is bolted or otherwise secured to the drum 5 on the inside thereof, said angle-bar extending entirely around said drum. To the flange 7 of the angle-bar 6 are bolted the spokes 4. The spokes 4 project out beyond the periphery of the drum 5 and form the apexes of the paddles 8. The paddles 8 are composed of the two sides 9 and 10, formed of wood or steel secured at their inner ends to the drum 5 by means of the screws 11. The outer ends of the side pieces 9 and 10, with the interposed spoke, are held together by means of the metal cap-piece 12, which extends for the entire length of the paddle, said cap-piece, the paddle, and spoke being secured together by the bolts 13. The paddle may be further secured by the bolt 14 passing through the spoke. The cap-piece being formed of metal protects the outer edge of the paddle and at the same time acts to bind the parts rigidly together.

When my improved paddle-wheel is in use, as it rotates to propel the boat forward the several paddles enter the water approximately flatwise, whereby they give greater propelling power in passing through the water. As they emerge from the water they do so substantially edgewise, so that they are withdrawn from the water with less power and do not have to lift a body of water as they emerge; but the water runs rapidly off the slanting faces of the paddles. If now the wheel is reversed, the same action takes place, as both sides of the paddle slope at the proper angle to produce the same effect so far as entering and withdrawing from the water is concerned.

By having the paddles projecting from the closed central drum no debris can enter and lodge in the spokes and around the shaft to interfere with and impede the rotation of the wheel and result in a consequent loss of power and the necessity of removing said debris, with loss of much time and labor.

The parts of my improved wheel are so combined and braced as to present a very strong durable structure capable of withstanding the severe usage to which such wheels are subjected.

What I claim is—

1. A paddle-wheel comprising a shaft, spokes radiating from said shaft, a drum beyond which said spokes extend, and a series of paddles whose faces slope in opposite directions from said spokes to said drum.

2. A paddle-wheel comprising a shaft, spokes radiating therefrom, a drum, a series of V-shaped paddles secured to said spokes and to said drum.

In testimony whereof I, the said JOHN BEST, have hereunto set my hand.

JOHN BEST.

Witnesses:
ROBERT C. TOTTEN,
G. KREMER.